(12) United States Patent
Park et al.

(10) Patent No.: US 9,807,218 B2
(45) Date of Patent: Oct. 31, 2017

(54) METHOD FOR FILTERING SPAM IN ELECTRONIC DEVICE AND THE ELECTRONIC DEVICE

(71) Applicant: Samsung Electronics Co., Ltd., Suwon-si, Gyeonggi-do (KR)

(72) Inventors: Jae-Hyun Park, Seongnam-si (KR); Hey-Young Park, Seoul (KR); Jong-Kyu Bae, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 14/553,236

(22) Filed: Nov. 25, 2014

(65) Prior Publication Data

US 2015/0156300 A1    Jun. 4, 2015

(30) Foreign Application Priority Data

Nov. 29, 2013  (KR) .......................... 10-2013-0147594

(51) Int. Cl.
| | |
|---|---|
| *H04M 3/42* | (2006.01) |
| *H04M 1/663* | (2006.01) |
| *H04L 29/06* | (2006.01) |
| *H04L 12/58* | (2006.01) |

(52) U.S. Cl.
CPC ............ *H04M 1/663* (2013.01); *H04L 51/12* (2013.01); *H04L 63/1483* (2013.01)

(58) Field of Classification Search
CPC ............................ H04M 1/663; H04L 63/1483

USPC ........................................ 455/414.1; 370/338
See application file for complete search history.

(56) References Cited

U.S. PATENT DOCUMENTS

2011/0294478 A1* 12/2011 Trivi ..................... H04M 3/436
                                                          455/415
2012/0321064 A1* 12/2012 Czachor, Jr. .......... H04M 3/436
                                                         379/210.02

FOREIGN PATENT DOCUMENTS

| KR | 1020030040949 A | 5/2003 | |
|---|---|---|---|
| KR | 1020060084115 A | 7/2006 | |
| KR | 2009121169 A * | 11/2009 | ............ H04L 12/28 |
| KR | 1020090121168 A | 11/2009 | |
| KR | 1020100058964 A | 6/2010 | |
| KR | 1020100059007 A | 6/2010 | |
| KR | 1020110108133 A | 10/2011 | |
| KR | 1020120140479 A | 12/2012 | |
| KR | 1020130082953 A | 7/2013 | |
| KR | 1020130083286 A | 7/2013 | |

* cited by examiner

*Primary Examiner* — Marcos Batista
(74) *Attorney, Agent, or Firm* — Jefferson IP Law, LLP

(57) ABSTRACT

A method for filtering spam in an electronic device is provided. The method includes transmitting a request message inquiring whether a received call or message is spam to a server through a mobile communication network, in response to the received call or message being determined to be spam based on a response message received from the server, displaying an alert message, and storing a sender phone number of the received call or message in a spam phone number list.

16 Claims, 18 Drawing Sheets

| tbl_call_history |
|---|
| sender:01012345678 |
| time:142 |
| timestamp:1381882955074 |

FIG.6A

| tbl_sms_storage |
|---|
| sender:01012345680 |
| sms:<br>[asset management]www.my.com<br>no commission event |
| timestamp:1381882955074 |

FIG.6B

| tbl_spam_number |
|---|
| sender:01012345679 |
| timestamp:1381882955074 |

FIG.6C

| tbl_sms_spam |
|---|
| key1:asset management |
| key2:commission |
| key3:event |
| key4:..... |
| key5:..... |

FIG.6D

Request message

・Request Description

| Field Name | Description |
|---|---|
| Uri | /{PhoneNumber} |
| Method | GET |

・Request Sample

| http://{Hostname}/01012345678 |
|---|

FIG.9

Response message

• Response Description

| Parameter Name | Type | Description |
|---|---|---|
| resultCode | String | SUCCESS : OK, FAIL: ERROR CODE |
| resultMessage | String | RESULT MESSAGE |
| phoneNumber | String | PHONE NUMBER |
| spam | String | Y : SPAM<br>N : NORMAL |

• Response Code

| Http Response Code | Description |
|---|---|
| 200 | OK |
| 400 | ERROR PROCESSING |
| 500 | EXCEPTION OCCURRENCE |

• Response Sample

```
{
  "resultCode":"OK",
  "resultMessage":"",
  "phoneNumber":"01012345678",
  "spam":"Y"
}
```

FIG.10

Spam Phone Number List

| | |
|---|---|
| spam_number1 | sender:01012345679 |
| | timestamp:1381882955074 |
| | -- |
| spam_number2 | sender:01012345610 |
| | timestamp:1381890050756 |
| | -- |
| ⋮ | ⋮ |

FIG.11

Report message

• Description

| Parameter Name | Type | Description |
|---|---|---|
| phoneNumber | String | SENDER PHONE NUMBER |
| CallTime | String | CALL TIME (SECONDS) |

• Report Sample

```
{
   "phoneNumber":"01012345678",
   "CallTime":"10"
}
```

FIG.15

Accusation message

· Description

| Parameter Name | Type | Description |
|---|---|---|
| SendNumber | String | SENDER PHONE NUMBER |
| RecvNumber | String | RECIPIENT PHONE NUMBER |
| CallTime | String | CALL TIME (SECONDS) |
| Message | String | SPAM MESSAGE CONTENT |

· Report Sample_call

```
{
   "SendNumber":"01012345678",
   "RecvNumber":"01056781234",
   "Calltime":"10",
   "Message":""
}
```

· Report Sample_sms

```
{
   "SendNumber":"01012345678",
   "ResultMessage":"01056781234",
   "CallTime":"0",
   "Message":"do you want...."
}
```

METHOD FOR FILTERING SPAM IN ELECTRONIC DEVICE AND THE ELECTRONIC DEVICE

CROSS-REFERENCE TO RELATED APPLICATION(S)

This application claims the benefit under 35 U.S.C. §119 (a) of a Korean patent application filed on Nov. 29, 2013 in the Korean Intellectual Property Office and assigned Serial number 10-2013-0147594, the entire disclosure of which is hereby incorporated by reference.

TECHNICAL FIELD

The present disclosure relates to a method for filtering spam in an electronic device and the electronic device.

BACKGROUND

Generally, spam refers to an unsolicited junk message or an unsolicited junk mail, frequently with commercial content, transmitted to an indiscriminate set of recipients through Internet, and spamming refers to sending spam indiscriminately. With the proliferation of electronic devices, such as a smart phone or a tablet personal computer (PC), there is an increasing tendency to indiscriminately send a spam call or a spam message through a mobile communication network.

Further, Internet calling makes bulk message processing possible and phone numbers are edited through a computer. The spam call made through Internet calling is made by collecting Voice over Internet protocol (VoIP) addresses and using a spambot program used as a hacking tool, so that the spam call which is made through Internet calling are hardly tracked. For example, voice phishing is the criminal practice of using social engineering over the telephone system to gain access to private personal and financial information from the public for the purpose of financial reward.

Message spam is the practice of sending unwanted short message service (SMS) messages or multimedia message service (MMS) messages, frequently with commercial content, in large quantities to an indiscriminate set of recipients. The message spam corresponds to email spam that is the practice of sending unwanted commercial emails in large quantities to an indiscriminate set of recipients by suing an email address list.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for filtering spam in an electronic device, which efficiently filters a spam call or a spam message in a various types of electronic devices, such as a smart phone or a tablet Personal Computer (PC), and the electronic device.

In accordance with an aspect of the present disclosure, a method for filtering spam in an electronic device is provided. The method includes transmitting a request message inquiring whether a received call or message is spam to a server through a mobile communication network, in response to the received call or message being determined to be spam based on a response message received from the server, displaying an alert message, and storing a sender phone number of the received call or message in a spam phone number list.

In accordance with another aspect of the present disclosure, an electronic device is provided. The device includes a communication module configured to communicate with a server through a mobile communication network, and a processor configured to transmit a request message inquiring whether a received call or message is spam to a server, to receive a response message from the server, in response the received call or message being determined to be spam, to display alert message, and to store a sender phone number of the received call or message in a spam phone number list.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which:

FIGS. 6A, 6B, 6C, and 6D are diagrams illustrating a configuration of a database according to an embodiment of the present disclosure;

FIG. 9 is a diagram illustrating a configuration of a request message according to an embodiment of the present disclosure;

FIG. 10 is a diagram illustrating a configuration of a response message according to an embodiment of the present disclosure;

FIG. 11 is a diagram illustrating a configuration of a spam phone number list according to an embodiment of the present disclosure;

FIG. 15 is a diagram illustrating a configuration of a report message according to an embodiment of the present disclosure;

FIG. 18 is a diagram illustrating a configuration of an accusation message according to an embodiment of the present disclosure.

Throughout the drawings, it should be noted that like reference numbers are used to depict the same or similar elements, features, and structures.

DETAILED DESCRIPTION

Figure 1:
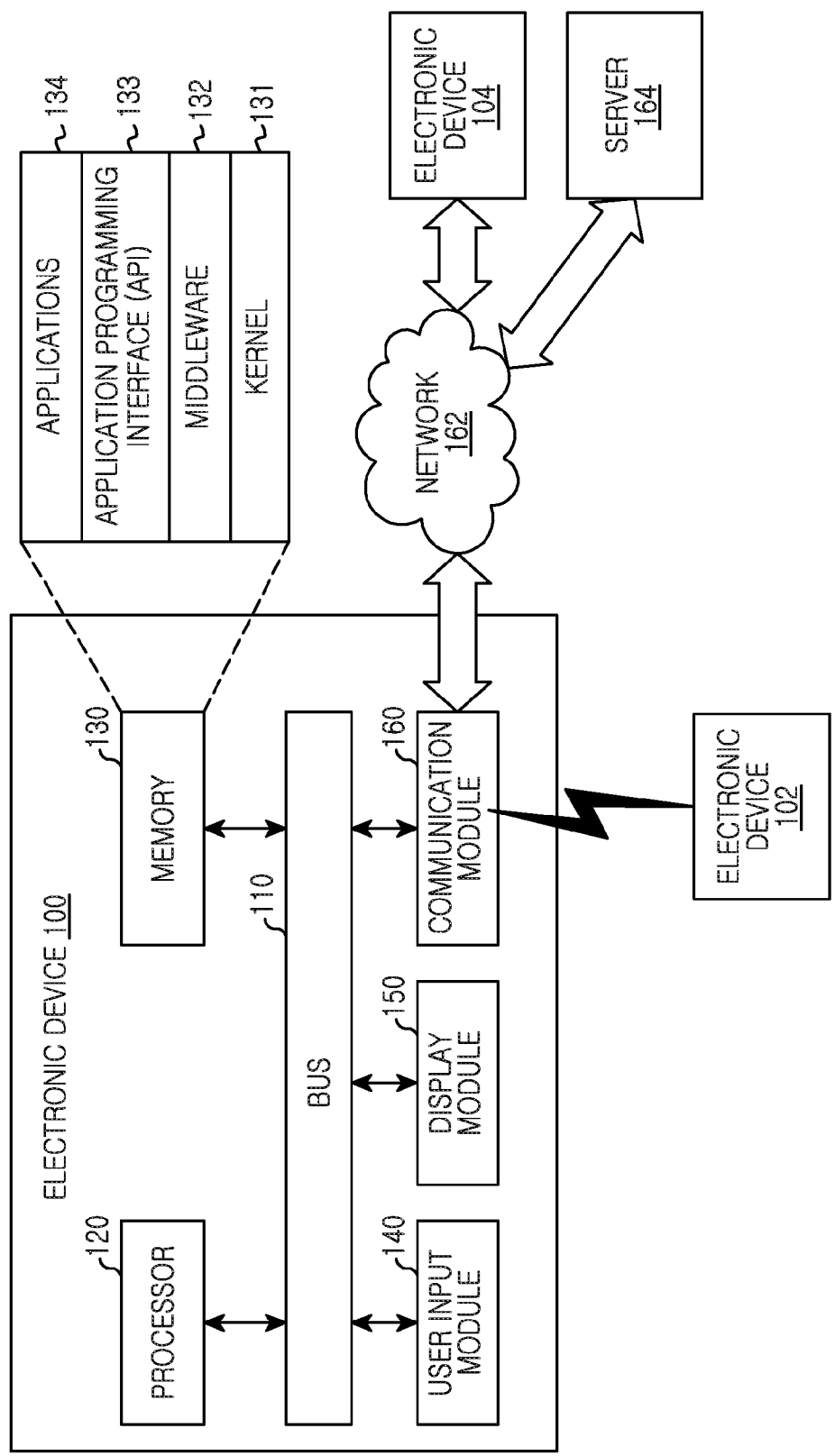
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be a device having a communication function. Examples of the electronic device according to various embodiments of the present disclosure may include one or a combination of one or more among various devices, such as a smart phone, a tablet personal computer, a mobile phone, a video phone, an e-book reader, a desktop personal computer, a laptop personal computer, a personal digital assistant, a portable multimedia player, an MP3 player, a mobile medical equipment, an electronic bracelet, an electronic necklace, an electronic accessory, a camera, or a wearable device, an electronic clock, a wrist watch, a smart white appliance (e.g., a refrigerator, an air-conditioner, a cleaner, an intelligent robot, a television (TV), a digital video disk (DVD) player, an audio system, an oven, a microwave oven, a washing machine, an air cleaner, or a digital photo frame), various types of medical equipments (e.g., a magnetic resonance angiography (MRA) imaging device, a magnetic resonance imaging (MRI) device, a computed tomography (CT) imaging device, an imaging device, or an ultrasonic imaging device), a navigation device, a global positioning system (GPS) receiver, an event data recorder (EDR), a flight data recorder (FDR), a set-top box, a TV box (e.g., Samsung HomeSync™, Apple TV™, or Google TV™), an electronic dictionary, a vehicle infotainment device, an electronic equipment for ships (e.g., a ship navigation device or a gyro-compass device), an avionics device, a security equipment, an electronic clothing, an electronic key, a camcorder, a game console, a Head-Mounted Display (HMD) a flat panel display device, an electronic album, a furniture or a portion of a building/structure including a communication function, an electronic board, an electronic signature receiving device, a protector, and/or the like. In addition, it is obvious to those skilled in the art that an electronic device according to various embodiments of the present disclosure is not limited to the above-described devices.

FIG. 1 is a block diagram of an electronic device according to an embodiment of the present disclosure.

Referring to FIG. 1, the electronic device 100 may include a bus 110, a processor 120, a memory 130, a user input module 140, a display module 150, and a communication module 160. The bus 110 may be a circuit that connects the above-described elements to one another and transfers communication (e.g., a control message) between the above-described elements.

The processor 120 may receive a command from the above-described component (e.g., the memory 130, the user input module 140, the display module 150, the communication module 160, and/or the like) through, for example, the bus 110, decode the received command, and perform data operations or data processing according to the decoded command.

The memory 130 may store a command or data received from or generated by the processor 120 or other elements (e.g., the user input module 140, the display module 150, the communication interface 160, and/or the like). The memory 130 may include programming modules, for example, a kernel 131, middleware 132, an application programming interface (API) 133, or applications 134. The above programming modules may be configured by software, firmware, hardware, or a combination of at least two thereof.

The kernel 131 may control or manage system resources (e.g., the bus 110, the processor 120, the memory 130, and/or the like) used to execute an operation or function implemented by the other programming modules (e.g., the middleware 132, the API 133, the applications 134, and/or the like). The kernel 131 may provide an interface that allows the middle 132, the API 133 or the application 134 to access and then control or manage respective elements of the electronic device 100.

The middleware 132 may perform a relay function such that the API 133 or the application 134 communicates with the kernel 131 for transmission and reception of data. In addition, the middleware 132 may perform load balancing of task requests received from a plurality of applications 134 in such a way that a priority of using the system resources (e.g., the bus 110, the processor 120, the memory 130, and/or the like) of the electronic device 100 is assigned to at least one application of the plurality of applications 134 according to the transaction requests. The API 133 is an interface for enabling the applications 134 to control functions provided by the kernel 131 or the middleware 132 and includes, for example, at least one interface or function for file control, window control, image processing, massage control, and/or the like.

The user input module 140 may receive a command or data from, for example, a user and transfer the command and data to the processor 120 or the memory 130 through the bus 110. The display module 150 may display pictures, images, or data to the user. The communication module 160 may perform communication between another electronic device 102 and the electronic device 100, and support a predetermined near-field communication protocol (e.g., Wireless Fidelity (WiFi), Bluetooth (BT), Near Field Communication (NFC), and/or the like) and/or a predetermined network communication 162 (e.g., Internet, Local Area Network (LAN), Wide Area Network (WAN), telecommunication network, cellular network, satellite network, Plain Old Telephone Service (POTS), and/or the like). The electronic devices 102 and 104 may be a device identical to (e.g., same type) or different from (e.g., different type) the electronic device 100. According to various embodiments of the present disclosure, the electronic device 100 may communicate with a server 164 over the network 162.

Figure 2:
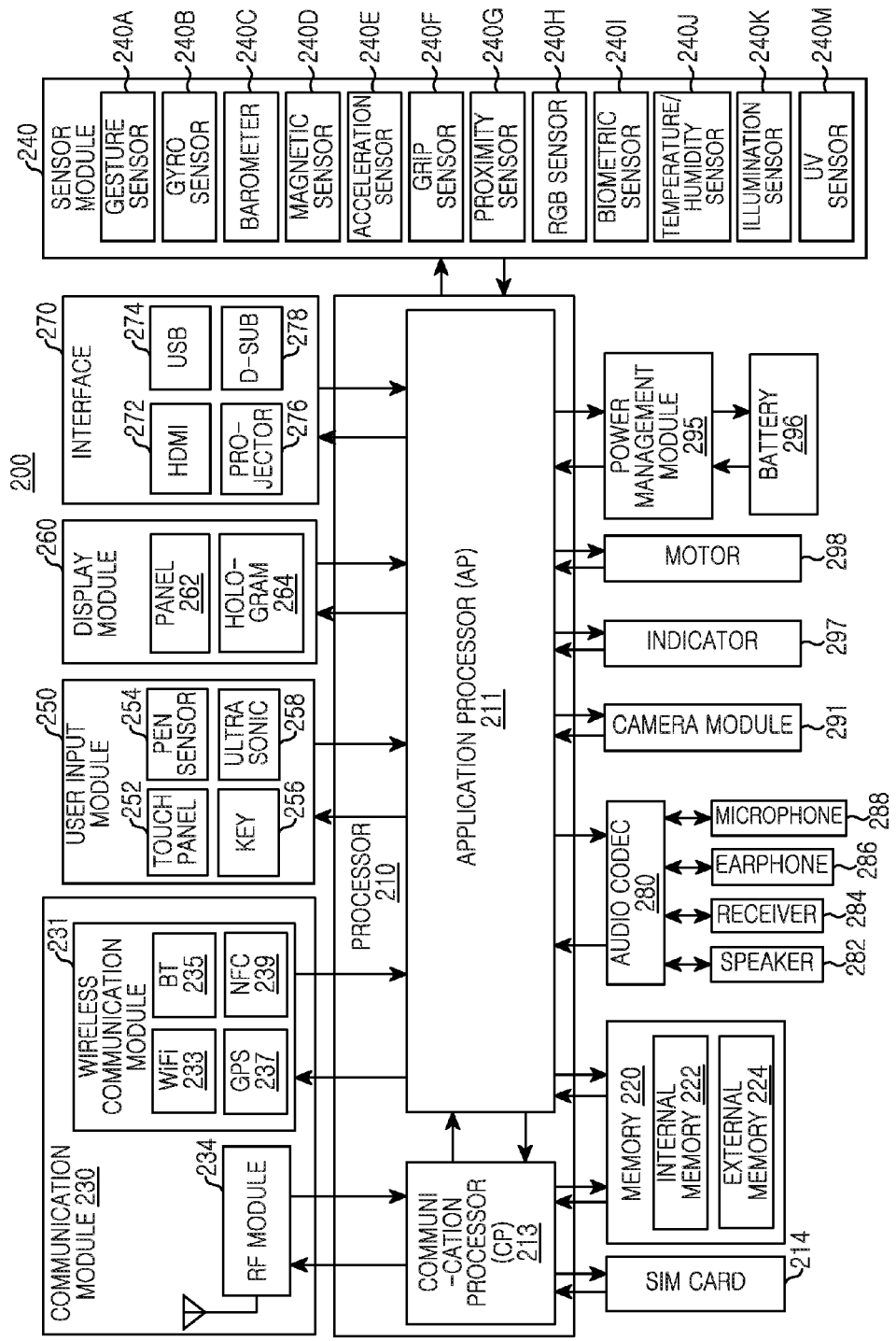
FIG. 2 is a block diagram of hardware according to an embodiment of the present disclosure.

FIG. 2 is a block diagram of hardware according to an embodiment of the present disclosure. The hardware 200 may be, for example, the electronic device 100 illustrated in FIG. 1.

Referring to FIG. 2, the hardware 200 may include at least one processor 210, a subscriber identity module (SIM) card 214, a memory 220, a communication module 230, a sensor module 240, a user input module 250, a display module 260, an interface 270, an audio codec 280, a camera module 291, a power management module 295, a battery 296, an indicator 297, a motor 298, and/or the like.

The processor 210 (e.g., the processor 120) may include at least one application processor (AP) 211 or at least one communication processor (CP) 213. The processor 210 may be, for example, the processor 120 illustrated in FIG. 1. Although the AP 211 and the CP 213 are illustrated as being included in the processor 210 in FIG. 1, the AP 211 and the CP 213 may be included in different IC packages respectively. According to various embodiments of the present disclosure, the AP 211 and the CP 213 may be included in one integrated circuit (IC) package.

The AP 211 may execute an operating system or application programs to control a plurality of hardware or software elements connected to the AP 211 and perform data processing and data operations on various types of data including multimedia data. The AP 211 may be implemented with, for example, a system on chip (SoC). According to various embodiments of the present disclosure, the processor 210 may further include a graphic processing unit (GPU) (not illustrated). The CP 213 may perform a function of managing data links for communication between an electronic device (e.g., the electronic device 100) including the hardware 200 and other electronic devices connected to the electronic device through networks and a function of converting communication protocols. The CP 213 may be implemented with, for example, an SoC.

According to an embodiment, the CP 213 may perform at least one of multimedia control functions. The CP 213 may perform terminal identification and authentication using, for example, a subscriber identification module (e.g., the SIM card 214) within a communication network. In addition, the CP 213 may provide services, such as a voice call, a video call, a text message, or packet data, to a user. In addition, the CP 213 may control the data transmission and reception of the communication module 230. Although the elements, such as the CP 213, the power management module 295, or the memory 220, are illustrated as being provided separately from the AP 211 in FIG. 2, the AP 211 may be implemented to include at least one (e.g., the CP 213) of the above-described elements according to an embodiment.

According to various embodiments of the present disclosure, the AP 211 or the CP 213 may load a command or data received from at least one of a nonvolatile memory or another element connected to the AP 111 or the CP 113 into a volatile memory and process the command or data. In addition, the AP 211 or the CP 213 may store data received from or generated by at least one of other elements in the nonvolatile memory.

The SIM card 214 may be a card implementing a subscriber identity module or may be inserted into a slot formed at a specific position of the electronic device. The SIM card 214 may include unique identification information (e.g., integrated circuit card identifier (ICCID)) subscriber information (e.g., international mobile subscriber identity (IMSI)), and/or the like.

The memory 220 may include an internal memory 222 and/or an external memory 224. The memory 220 may be, for example, the memory 130 illustrated in FIG. 1. The built-in memory 222 may include at least one of, for example, an volatile memory (e.g., a dynamic random access memory (DRAM), a static RAM (SRAM), a synchronous dynamic RAM (SDRAM), and/or the like), and/or a non-volatile memory (e.g., a one time programmable read-only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and/or the like). According to various embodiments of the present disclosure, the internal memory 222 may have a solid state drive (SSD) type. The external memory 224 may further include, for example, a compact flash (CF) card, a secure digital (SD) card, a Micro-SD card, a Mini-SD card, an extreme digital (xD) card, a memory stick, and/or the like.

The communication module 230 may include a wireless communication module 231 or an RF module 234. The communication module 230 may be, for example, the communication module 160 illustrated in FIG. 1. The wireless communication module 231 may include, for example, a WiFi module 233, a BT module 235, a GPS module 237, a near field communication (NFC) module 239, and/or the like. For example, the wireless communication module 231 may provide a wireless communication function by using radio frequencies. Additionally or alternatively, the wireless communication module 231 may include a network interface (e.g., a LAN card, and/or the like) or a modem, which connects the hardware 200 to a network (e.g., Internet, a LAN, a WAN, a telecommunication network, a cellular network, a satellite network, a POTS, and/or the like).

The RF module 234 may perform transmission and reception of data, for example, transmission and reception of RF signals or requested electronic signals. Although not illustrated, the RF module 234 may include, for example, a transceiver, a power amp module (PAM), a frequency filter, a low noise amplifier (LNA), and/or the like. The RF module 234 may further include a component for transmitting and receiving electromagnetic waves in free space for wireless communication, for example, a conductor or a conductive line.

The sensor module 240 may include at least one of, for example, a gesture sensor 240A, a gyro sensor 240B, a barometer 240C, a magnetic sensor 240D, an acceleration sensor 240E, a grip sensor 240F, a proximity sensor 240G, a red-green-blue (RGB) sensor 240H, a biometric sensor 240I, a temperature/humidity sensor 240J, an illuminance sensor 240K, an ultra violet (UV) sensor 240M, and/or the like. The sensor module 240 may measure a physical amount or detect an operating state of the electronic device and convert measured or detected information into an electrical signal. Additionally/alternatively, the sensor module 240 may include, for example, an E-nose sensor (not illustrated), an electromyography (EMG) sensor (not illustrated), an electroencephalogram (EEG) sensor, (not illustrated), an electrocardiogram (ECG) sensor (not illustrated), a fingerprint sensor, and/or the like. The sensor module 240 may further include a control circuit for controlling at least one sensor included therein.

The user input module 250 may include a touch panel 252, a (digital) pen sensor 254, a key 256, an ultrasonic input device 258, and/or the like. The user input module 250 may be, for example, the user input module 140 illustrated in FIG. 1. For example, the touch panel 252 may recognize a touch input by using at least one of a capacitive method, a resistive method, an infrared method, an ultrasonic method, and/or the like. In addition, the touch panel 252 may further include a controller (not illustrated). In the case of the capacitive method, proximity recognition may be possible in addition to detection of a direct touch. The touch panel 252 may further include a tactile layer. In this case, the touch panel 252 may provide a tactile response to a user.

The (digital) pen sensor 254 may be implemented by using, for example, a method identical or similar to a method for receiving a touch input or by using a separate recognition sheet. For example, a keypad or a touch key may be used as the key 256. The ultrasonic input device 258 is a device for detecting a sound wave using a microphone (e.g., a microphone 288) and identifying data in a terminal, through a pen for generating an ultrasonic signal to facilitate wireless recognition. According to various embodiments of the present disclosure, the hardware 200 may receive a user input from an external device (e.g., a network, a computer, or a server) connected thereto by using the communication module 230.

The display module 260 may include a panel 262 and a hologram 264. The display module 260 may be, for example, the display module 150 illustrated in FIG. 1. The panel 262 may be, for example, a liquid-crystal display (LCD) panel, an active-matrix organic light-emitting diode (AM-OLED) panel, and/or the like. The panel 262 may be implemented to be, for example, flexible, transparent, and/or wearable. The panel 262 and the touch panel 252 may be formed as one module. The hologram 264 may enable a three-dimensional image to be viewed in space using optical interference. According to various embodiments of the present disclosure, the display module 260 may further include a control circuit for controlling the panel 262 and the hologram 264.

The interface 270 may include, for example, a high-definition multimedia interface (HDMI) 272, a universal serial bus (USB) 274, a projector 276 or a D-subminiature (D-sub) 278. Additionally or alternatively, the interface 270 may include, for example, a SD/multi-media card (MMC) interface (not illustrated) or an infrared data association (IrDA) interface (not illustrated).

The audio codec 280 may perform bidirectional conversion between voice and electric signals. The audio codec 280 may perform conversion of voice information input or output through, for example, a speaker 282, a receiver 284, an earphone 286, the microphone 288, and/or the like.

The camera module 291 is a device for capturing an image and moving images. According to various embodiments of the present disclosure, the camera module 291 may include at least one image sensor (e.g., a front lens or a rear lens), an image signal processor (not illustrated), a flash LED (not illustrated), and/or the like.

The power management module 295 may manage power of the hardware 200. Although not illustrated, the power management module 295 may include, for example, a power management integrated circuit (PMIC), a charger integrated circuit, or a battery fuel gauge.

The PMIC may be mounted on, for example, an integrated circuit or a SoC semiconductor. A charging method may include a wired charging method and a wireless charging method. The charger IC may charge a battery and prevent the application of overvoltage or overcurrent from a charger. According to various embodiments of the present disclosure, the charger IC may include a charger IC for at least one of a wired charging method or a wireless charging method. The wireless charging method may include, for example, an inductive coupling method, an electromagnetic (EM) radiation method, and a magnetic resonant coupling method. An additional circuit for wireless power transfer, for example, a coil loop, a resonant circuit, or a rectifier may be further included.

A battery gauge may measure, for example, an amount of power remaining, or a voltage, a current or a temperature during charging of the battery 296. The battery 296 may generate electricity and supply power and may be, for example, a rechargeable battery. The indicator 297 may indicate a specific state of the hardware 200 or an element thereof (e.g., the AP 211), for example, a booting state, a standby state, a charge state, and/or the like. The motor 298 may convert electrical signals into mechanical vibration. The MCU (not illustrated) may control the sensor module 240. Although not illustrated, the hardware 200 may include a processing device (e.g., a GPU) for supporting a mobile TV. The processing device for supporting mobile TV services may process media data compliant with a standard, such as digital multimedia broadcasting (DMB), digital video broadcasting (DVB), media flow, and/or the like.

The names of the above-described elements of the hardware according to various embodiments of the present disclosure may vary according to a type of the electronic device. The hardware according to various embodiments of the present disclosure may be configured by including at least one of the above-described elements. Some elements may be omitted from, or additional other elements may be further included in the hardware. When some of the elements of the hardware according to various embodiments of the present disclosure are combined into one entity, the one entity may perform the functions of the elements before combination.

Figure 3:
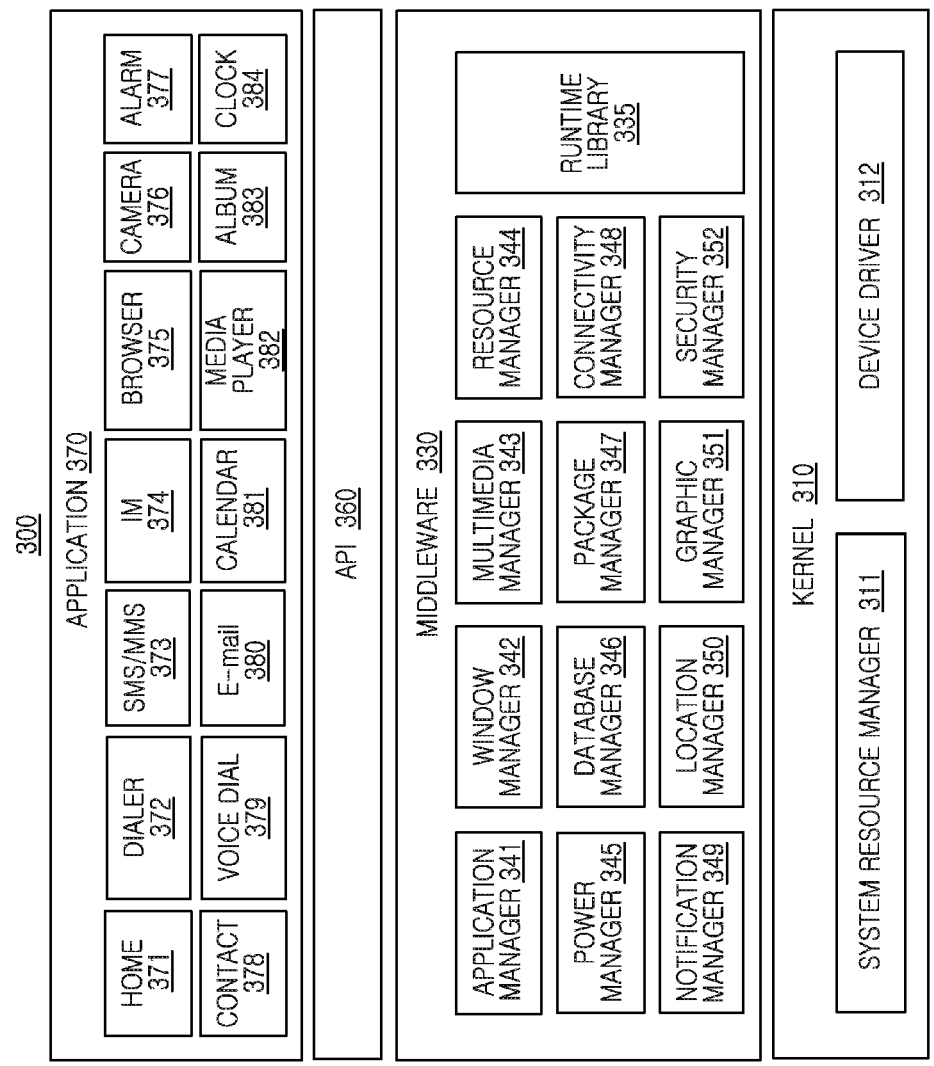
FIG. 3 is a block diagram of a programming module according to an embodiment of the present disclosure.

FIG. 3 is a block diagram of a programming module according to an embodiment of the present disclosure.

Referring to FIG. 3, the programming module 300 may be included (e.g., stored) in the electronic device 100 (e.g., the memory 130) illustrated in FIG. 1. At least a part of the programming module 300 may be configured by software, firmware, hardware, or a combination of at least two thereof.

The programming module 300 may include an operating system (OS) implemented in hardware (e.g., the hardware 200), which controls resources associated with an electronic device (e.g., the electronic device 100) or various applications (e.g., applications 370) executed in the OS. For example, the OS may be Android, iOS, Windows, Symbian, Tizen, or Bada. Referring to FIG. 1, the programming module 300 may include a kernel 310, middleware 330, an application programming interface (API) 360, or one or more applications 370.

The kernel 310 (e.g., the kernel 131) may include a system resource manager 311 and a device driver 312. The system resource manager 311 may perform control, allocation or deallocation of system resources. The device driver 312 may include an inter-process communication (IPC) driver (not illustrated).

The middleware 330 may include a plurality of modules which are implemented in advance in order to provide functions commonly needed by the applications 370. In addition, the middleware 330 may provide functions through the API 360 such that the applications 370 efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module a compiler uses in order to add a new function through a programming language, for example, during execution of the applications 370. According to various embodiments of the present disclosure, the runtime library 335 may perform functions associated with input/output, memory management, or arithmetic functions.

The application manager 341 may manage a life cycle of at least one of the applications 370, for example.

The window manager 342 may manage GUI resources used for a screen.

The multimedia manager 343 may figure out formats needed for reproduction of various media files and perform encoding or decoding of the media files by using a codec suitable for each format.

The resource manager 344 may manage resources, such as source codes of at least one of the applications 370, a memory, storage space, and/or the like.

The power manager 345 may manage a battery or a power supply in cooperation with a basic input/output system (BIOS) and provide power information required for an operation.

The database manager 346 may perform management to generate, search, and change a database to be used by at least one application of the applications 370.

The package manager 347 may manage installation or update of an application provided in the form of a package file.

The connectivity manager 348 may manage wireless connectivity, such as WiFi, Bluetooth, and/or the like. The connectivity manager 358 may manage wired connectivity such a LAN connectivity.

The notification manager 349 may display or notify of an event, such as message reception, a promise, proximity notification, and/or the like in a manner without producing disturbance to the user.

The location manager 350 may manage location information of the electronic device.

The graphic manager 351 may manage a graphic effect to be provided to the user or a related user interface.

The security manager 352 may provide general security functions necessary for system security or user authentication.

According to various embodiments of the present disclosure, when the electronic device (e.g., the electronic device 100) has a phone function, the middleware 330 may further include a telephony manager (not illustrated) for managing a voice call or video call function of the electronic device.

The middleware 330 may generate a new middleware module through a combination of various functions of the above-described internal element modules and use the middleware module. The middleware 330 may provide a module specified for each operating system type in order to a specific function. In addition, the middleware 330 may dynamically delete some of existing elements or add new elements. Therefore, an element of elements provided in various embodiments of the present disclosure may be omitted or another element may be further included. Alternatively, an element provided in various embodiments of the present disclosure may be substituted with a different element for performing a similar function.

The API 360 (e.g., 133) is a set of programming functions and may be provided in different configurations according to operating systems. For example, in the case of Android or iPhone OS (IOS), a single API set may be provided for each platform. In the case of Tizen, two or more API sets may be provided. The applications 370 (e.g., the application 134) may include for example, a preloaded application or a third party application. According to various embodiments of the present disclosure, the applications 370 may include a home application 371, a dialer application 372, an SMS/MMS application 373, an instant messenger (IM) application 374, a browser application 375, a camera application 376, an alarm application 377, a contact application 378, a voice dial application 379, an email application 380, a calendar application 381, a media player application 382, an album application 383, a clock application 384, and/or the like.

At least a part of the programming module 300 may be implemented by an instruction stored in a non-transitory computer-readable storage media. When the instruction is executed by at least one processor (e.g., the processor 210), the processor perform a function corresponding to the instruction. The non-transitory computer-readable storage media may be, for example, the memory 260. The at least a part of the programming module 300 may be implemented (e.g., executed) by the processor 210 for example.

The at least a part of the programming module 300 may include, for example, a module, a program, a routine, a set of instructions, or a process, which performs one or more functions. The names of elements of the programming module (e.g., the programming module 300) according to various embodiments of the present disclosure may vary depending on operating system types. The programming module according to various embodiments of the present disclosure may include one or more elements among the above-described elements or exclude some elements among the above-described elements. Alternatively, the programming module may further include another element.

Operational principles of various embodiments of the present disclosure will be described herein below with reference to the accompanying drawings. In the following description, detailed descriptions of well-known functions or configurations will be omitted because such descriptions would unnecessarily obscure the subject matters of the present disclosure. In addition, the terms used herein are defined according to the functions of various embodiments of the present disclosure. Thus, the terms may vary depending on users' or operators' intentions or practices. Therefore, the terms used herein should be understood based on the descriptions made herein.

A method for filtering spam in an electronic device and the electronic device according to various embodiments of the present disclosure will be described below in detail. The electronic device according to various embodiments of the present disclosure may include elements illustrated in FIG. 3. The processor 210 of the electronic device may enable the communication module 230, the communication processor 213, and the application processor 211 to connect to a mobile communication network and communicate with a server.

According to various embodiments of the present disclosure, the server may be referred to as a "spam management server". When a call or a message associated with a sender phone number unregistered in, for example, a phone number list, is received, the processor 210 generates a request message for inquiring whether the call or the message is spam. For example, in response to receipt of a call, a message, and/or the like from a phone number that is not registered in the phone number list, the processor 210 may generate a request message for querying whether the call, the message, and/or the like is spam.

The processor 210 transmits the request message to the server. The server searches a database in which a variety of information (e.g., which is big data), is stored and transmits a response message corresponding to the request message.

The processor 210 receives the response and determines whether the received call or the received message is spam. In response to the processor 210 determining that the received call or message is spam, the processor 210 enables the display module 260 to display an alert message for reporting that the received call or the received message is spam. Accordingly, a user may select whether to reject a spam call or whether to check a spam message.

In response to the processor 210 determining that the received call or message is spam, the processor 210 may store a sender phone number of the received call or the received message in a spam phone number list. The spam phone number may be stored separately from the phone number list or may be stored to be integrated with the phone number list. Thereafter, when a call or a message, the sender phone number is unregistered in the phone number list, is received, the processor 210 may first determine whether the call or the message is a spam call or a spam message by searching the spam phone list.

The server may be implemented with, for example, one integrated sever or with a plurality of servers, such as a first server, a second server, and/or the like. The server manages a variety of spam information (e.g., which is big data) by using a database. The database may be implemented with one integrated database or a plurality of databases. The database may be referred to as a real-time updatable spam database.

Figure 4:
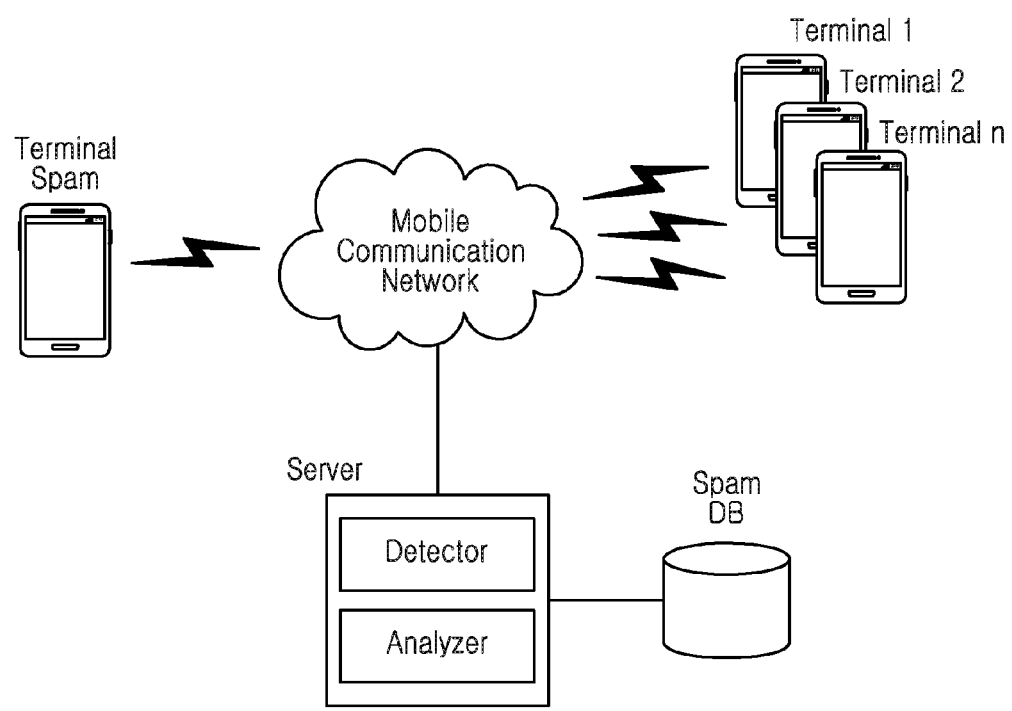
FIG. 4 is a diagram illustrating communication between an electronic device and a server according to an embodiment of the present disclosure.
Figure 5:
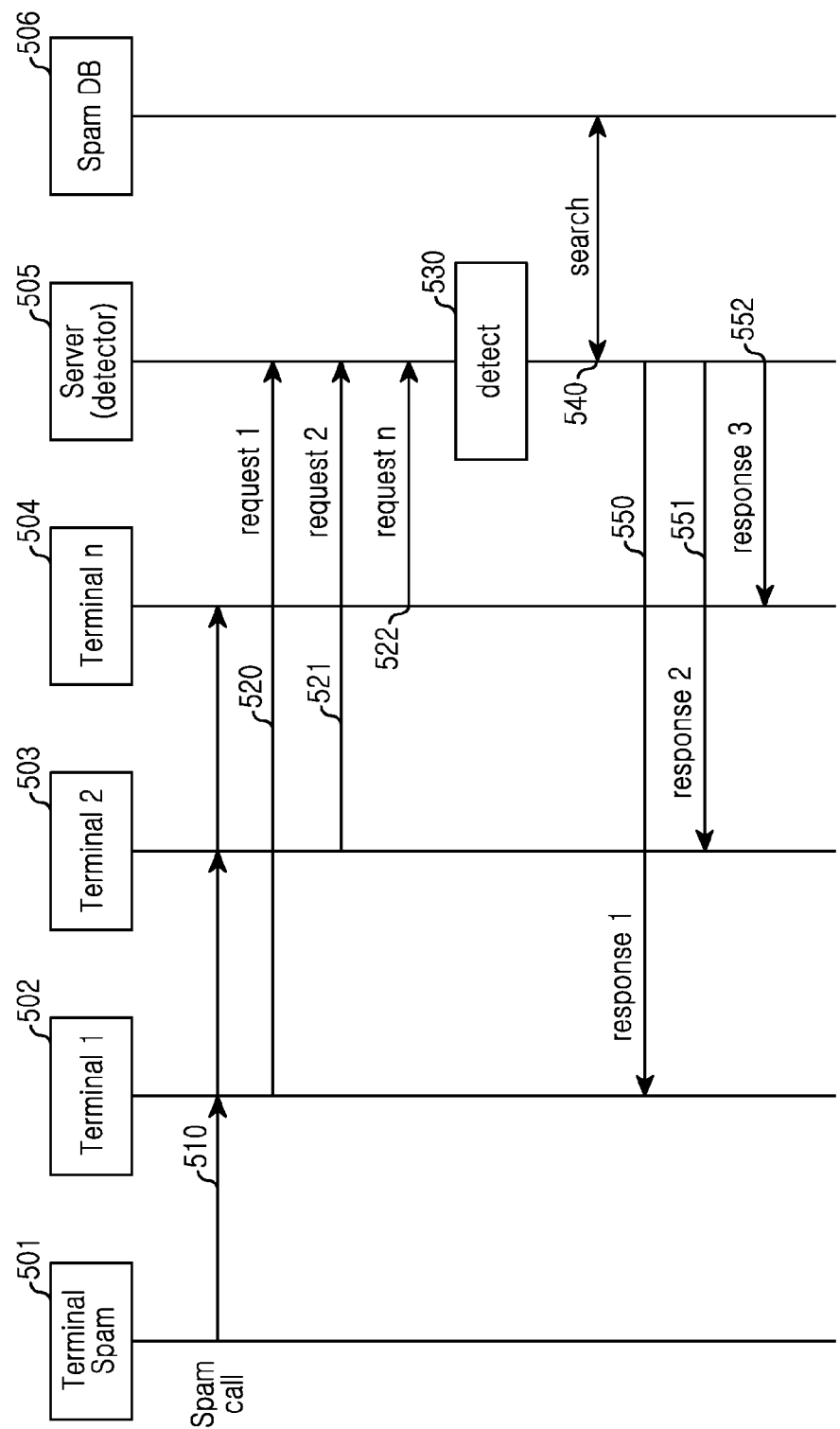
FIG. 5 is a diagram illustrating a process of communicating between an electronic device and a server according to an embodiment of the present disclosure.

FIG. 4 is a diagram illustrating communication between an electronic device and a server according to an embodiment of the present disclosure. FIG. 5 is a diagram illustrating a process of communicating between an electronic device and a server according to an embodiment of the present disclosure. For example, the electronic device, such as a smart phone or a tablet personal computer (PC) may be referred to as a terminal in a mobile communication network.

Referring to FIG. 4, a spam call or a spam message indiscriminately sent by a spam terminal may be transmitted to a plurality of terminals Terminal 1 to Terminal n. For example, in response to receiving a call or a message through a mobile communication network, the first terminal Terminal 1 may search a phone number list or a spam phone number list stored in a memory and determine whether the received call or the received message is spam.

For example, when a sender phone number of the received call or the received message is registered in the phone number list, a processor 210 of the first terminal determines that the received call or message is not spam. For example, in response to the first terminal searching the phone number list for the sender phone number and determining that the phone number list includes the sender phone number, the processor 210 of the first terminal determines that the received call or message is not spam. When the sender phone number is unregistered in the phone number list, the processor 210 determines that there is possibility that the received call or message is spam, and searches the spam phone number list. For example, in response to the first terminal searching the phone number list for the sender phone number and determining that the phone number list does not include the sender phone number, the processor 210 of the first terminal determines that the receive call or message may be spam. Thereafter, the terminal (e.g., the processor 210) searches the spam phone number list for the sender phone number. When the sender phone number is registered in the spam phone number list, the processor 210 of the first terminal determines that the received call or message is spam and displays an alert message. For example, in response to the first terminal searching the spam phone number list for the sender phone number and determining that the spam phone number list includes the sender phone number, the processor 210 may determine that the call or message is spam and alert the user that the call or the message is spam. When the sender phone number is unregistered in the spam phone number list, the processor 210 of the first terminal generates a request message request 1 for inquiring whether the received call or message is spam and transmits the request message request 1 to the server. For example, in response to the first terminal searching the spam phone number list for the sender phone number and determining that the spam phone number list does not include the sender phone number, the processor 210 of the first terminal may query the server for an indication as to whether the call or message is spam.

Referring to FIG. 5, at operation 510, a spam terminal 501 may communicate a call, a message, and/or the like to a terminal 1 502, a terminal 2 503, and/or a terminal n 504.

At operations 520, 521, and 522, the terminal 1 502, the terminal 2 503, and the terminal n 504 respectively transmit a request to a server 505. The request may correspond to a query for the server 505 to search a database for the phone number corresponding to the spam terminal 501. For example, the request may correspond to a query as to whether a spam database, which stores contact information of known spam terminals, has stored therein information on the spam terminal 501. The terminal 1 502, the terminal 2 503, and the terminal n 504 may respectively query the server 505 after performing a local search as to whether the spam terminal 501 is registered therewith (e.g., on a whitelist, a spam list, or the like).

At operation 530, the server 505 may detect or otherwise determine whether the message transmitted by the spam terminal 501 is spam. For example, the server 505 may perform a local search to determine whether the spam terminal 501 is registered therewith (e.g., on a whitelist, a spam list, or the like).

At operation 540, the server 505 may query a spam database 506 to determine whether the message transmitted by the spam terminal 501 is spam. For example, the server 505 may perform a search on the spam database 506 to determine whether the spam terminal 501 is registered therewith (e.g., on a whitelist, a spam list, or the like).

At operations 550, 551, and 552, the server 505 may respectively transmit a response to the request (e.g., as to whether the call, the message, and/or the like transmitted by the spam terminal 501 is spam). For example, the server 505 may provide an indication as to whether the spam terminal 501 is registered therewith (e.g., on a whitelist, a spam list, or the like).

FIGS. 6A, 6B, 6C, and 6D are diagrams illustrating a configuration of a database according to an embodiment of the present disclosure.

Referring to FIGS. 6A, 6B, 6C, and 6D, as described above, the server may be implemented with a plurality of servers or with one integrated spam management server. For example, as illustrated in FIG. 4, the server divided into a detector for mainly performing a spam search function, and an analyzer for mainly performing a spam analyzing function. The server may manage and update a variety of spam information by using a big-data database. The database may be managed as one database or may be divided into a plurality of databases for management.

The database may be referred to as a spam database. In the spam database, the variety of spam information may be classified into various types and be stored. For example, as illustrated in FIGS. 6A to 6D, the variety of spam information may be stored in a spam call history table tb1_call_history, a spam message storage table tb1_sms_storage, a spam number table tb1_spam_number, and a spam message pattern table tb1_sms_spam. The tables may be referred to as any other names. The spam call history table may include a sender phone number, a call time, a timestamp, and the like.

The call time may be given in units of seconds, which is measured from a time a call is answered to a time the call is terminated. The timestamp may be a time point at which the spam information is acquired by the server or a time point at which the call is answered or terminated. The spam message storage table may include a sender phone number, message content, a timestamp, and/or the like. The spam number table may include a sender phone number, a timestamp, and/or the like. In the spam message pattern table, texts having main patterns frequently used in a spam message may be stored according to priority of frequency of occurrence. In the tables, other spam information may be additionally included.

For example, when the request message transmitted from the first terminal is received, the server extracts the sender phone number from the request message and compares the sender phone number with the database. When, as a comparison result, the sender phone number is registered as a spam phone number, the server generates a response message corresponding to the result and transmits the response message to the first terminal. When the response message is received, the processor 210 of the first terminal determines whether the received call or the received message is spam based on a result code or a result message indicating whether the received call or message is spam, which is included in the response message.

Figure 7B:
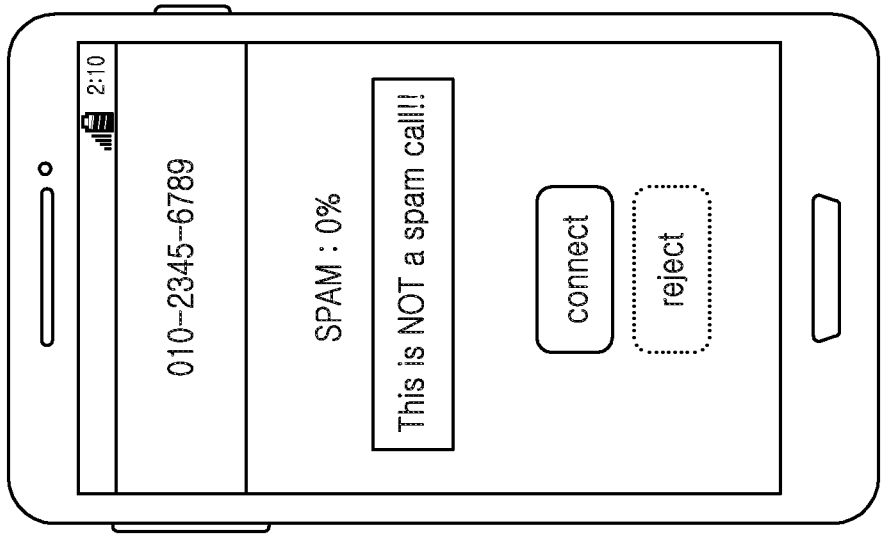
FIGS. 7A and 7B are diagrams illustrating an alert message displayed on an electronic device according to an embodiment of the present disclosure.
Figure 7A:
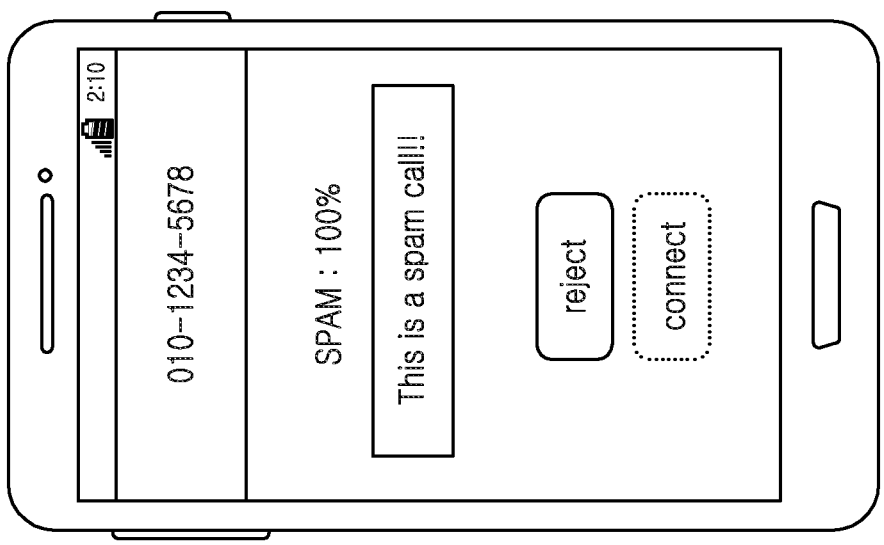

FIGS. 7A and 7B are diagrams illustrating an alert message displayed on an electronic device according to an embodiment of the present disclosure.

Referring to FIGS. 7A and 7B, in response to determining that the call or message is (e.g., or is likely to be) spam, the processor 210 of the first terminal displays an alert message indicating that the received call or message is a spam call or a spam message as illustrated in FIG. 7A. In addition, the processor 210 of the first terminal displays a user selection button, such as a call rejection button, or a message rejection button, thereby enabling the user to easily select whether to reject the spam call or whether to check the spam message. In response to determining that the received call or message is not (e.g., or is likely not) spam, the processor 210 of the first terminal display, for example, a guide message indicating that the received call or message is not a spam call or message, as illustrated in FIG. 7B. The alert message or the guide message displayed on the display module may be displayed in various forms.

Figure 8:
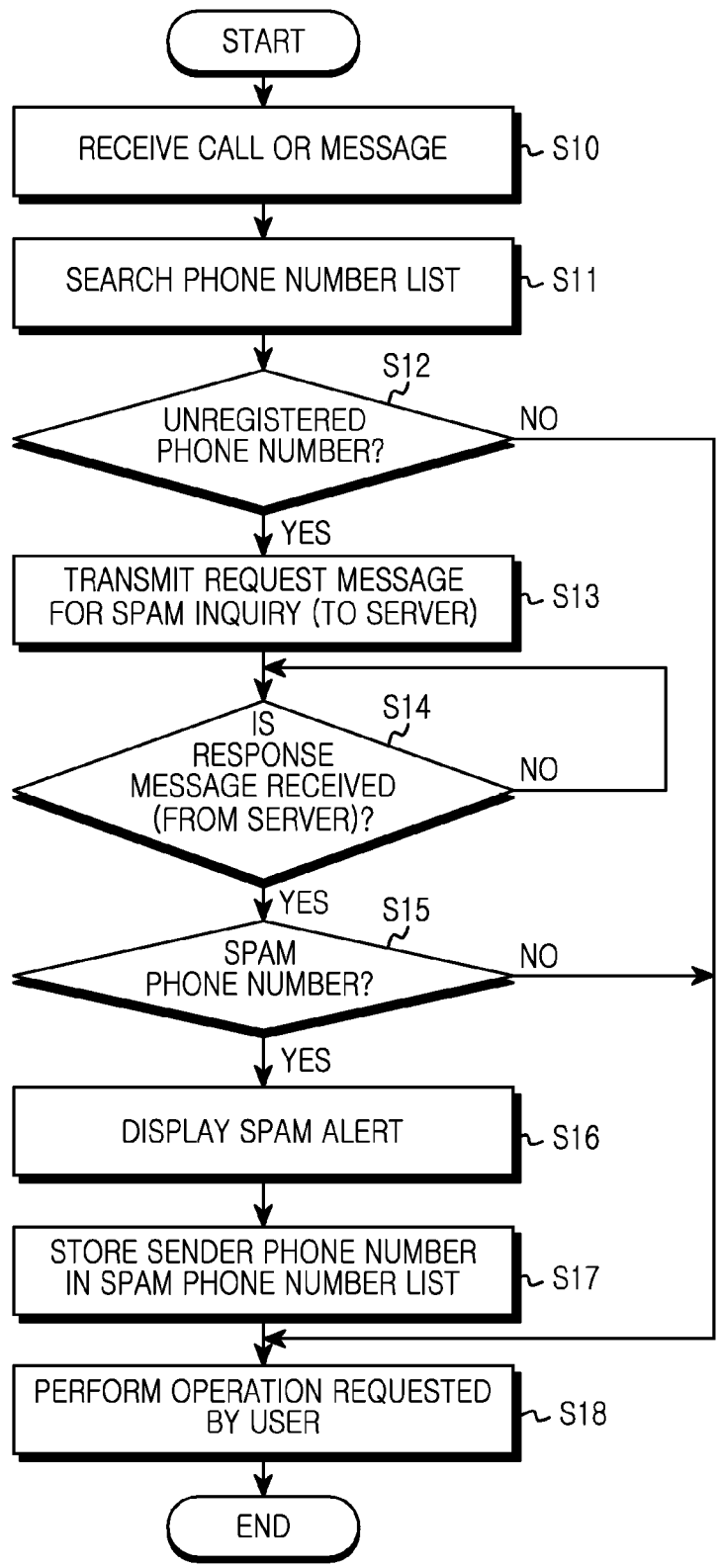
FIG. 8 is a diagram illustrating an operation flow of a method for filtering spam in an electronic device according to an embodiment of the present disclosure.

FIG. 8 is a diagram illustrating an operation flow of a method for filtering spam in an electronic device according to an embodiment of the present disclosure. FIG. 9 is a diagram illustrating a configuration of a request message according to an embodiment of the present disclosure. FIG. 10 is a diagram illustrating a configuration of a response message according to an embodiment of the present disclosure. FIG. 11 is a diagram illustrating a configuration of a spam phone number list according to an embodiment of the present disclosure.

Referring to FIG. 8, at operation S10, a call and/or a message is received. In response to receiving a call or message through a mobile communication network, the processor 210 of the electronic device illustrated in FIG. 3 identifies a sender phone number of the received call or the received message.

At operation 511, the processor 210 searches a phone number list stored in the memory 220.

At operation S12, the processor 210 determines whether the sender phone number is registered in the phone number list.

In response to determining that the sender phone number is registered in the phone number list at operation S12, the processor 210 determines that the received call or message is not spam. Thereafter, the processor 210 proceeds to operation S18 at which the processor 210 enables the user to accept the received call or to check the received message.

In contrast, in response to determining that the sender phone number is not registered in the phone number list at operation S12, the processor 210 proceeds to operation S13 at which the processor 210 enables the communication module 230, the communication processor 213, and the application processor 211 to generate a request message for inquiring whether the received call or the received message is spam and to transmit the request message to a server that manages spam information. For example, as illustrated in FIG. 9, the request message may include uniform resource identifier (Uri) information, such as a sender phone number used to inquire whether the call or message is spam.

The server extracts a sender phone number included in the request message and compares the sender phone number with a database storing a variety of spam information. The server determines whether the sender phone number is a spam phone number according to a comparison result and generates a response message corresponding to the request message. The server transmits the response message to the electronic device that has transmitted the request message. For example, as illustrated in FIG. 10, the response message may include a result code representing a result of spam determination, a result message, a phone number, and information indicating whether the sender phone number is a spam phone number. Other information may be additionally included in the response message.

The result code indicates that the spam determination is successful or failed. The result message may include for example, a percentage (%) of spam probability and a text of a guide message as illustrated in FIGS. 7A and 7B.

At operation S14, the processor 210 of the electronic device may determine whether a response message is received. For example, the processor 210 of the electronic device may determine whether a response message is received from the server.

If the processor 210 of the electronic device determines that a response message is not received at operation S14, then the processor 210 of the electronic device may continue to poll for an indication that the response message is received.

If the processor 210 of the electronic device determines that a response message is received at operation S14, then the processor 210 of the electronic device may proceed to operation S15 at which the processor 210 of the electronic device may determine whether the spam call or message is received from a spam phone number (e.g., that the phone number from which the call or message is received is a spam phone number). For example, in response to receiving the response message, the processor 210 of the electronic device checks a result code and a result message included in the response message and determines whether the sender phone number of the received call or message is the spam phone number.

If the processor 210 of the electronic device determines that the spam call or message is not received from a spam phone number (e.g., that the phone number from which the call or message is received is not a spam phone number) at operation S15, then the processor 210 of the electronic device may proceed to operation S18 at which the processor 10 performs the operation requested by the user.

In contrast, if the processor 210 of the electronic device determines that the spam call or message is received from a spam phone number (e.g., that the phone number from which the call or message is received is a spam phone number) at operation S15, then the processor 210 of the electronic device may proceed to operation S16 at which the processor 210 of the electronic device may display an alert indicating that the call or message may be spam. For example, in response to determining that the sender phone number of the received call or message is the spam phone number, the processor 210 of the electronic device enables the display module 260 to display a spam alert message.

Thereafter, at operation S17, the processor 210 of the electronic device stores the sender phone number which is determined as the spam phone number in the spam phone number list.

At operation S18, the processor 210 of the electronic device, performs an operation requested by the user S18. For example, referring to FIG. 11, in the spam phone number list may include sender phone numbers determined as spam phone numbers, timestamps, and the like in a list form. The timestamp may be a time point at which a relevant sender phone number is registered in the spam phone number list, or a time point at which the relevant sender phone number is determined as a spam phone number.

Figure 12:
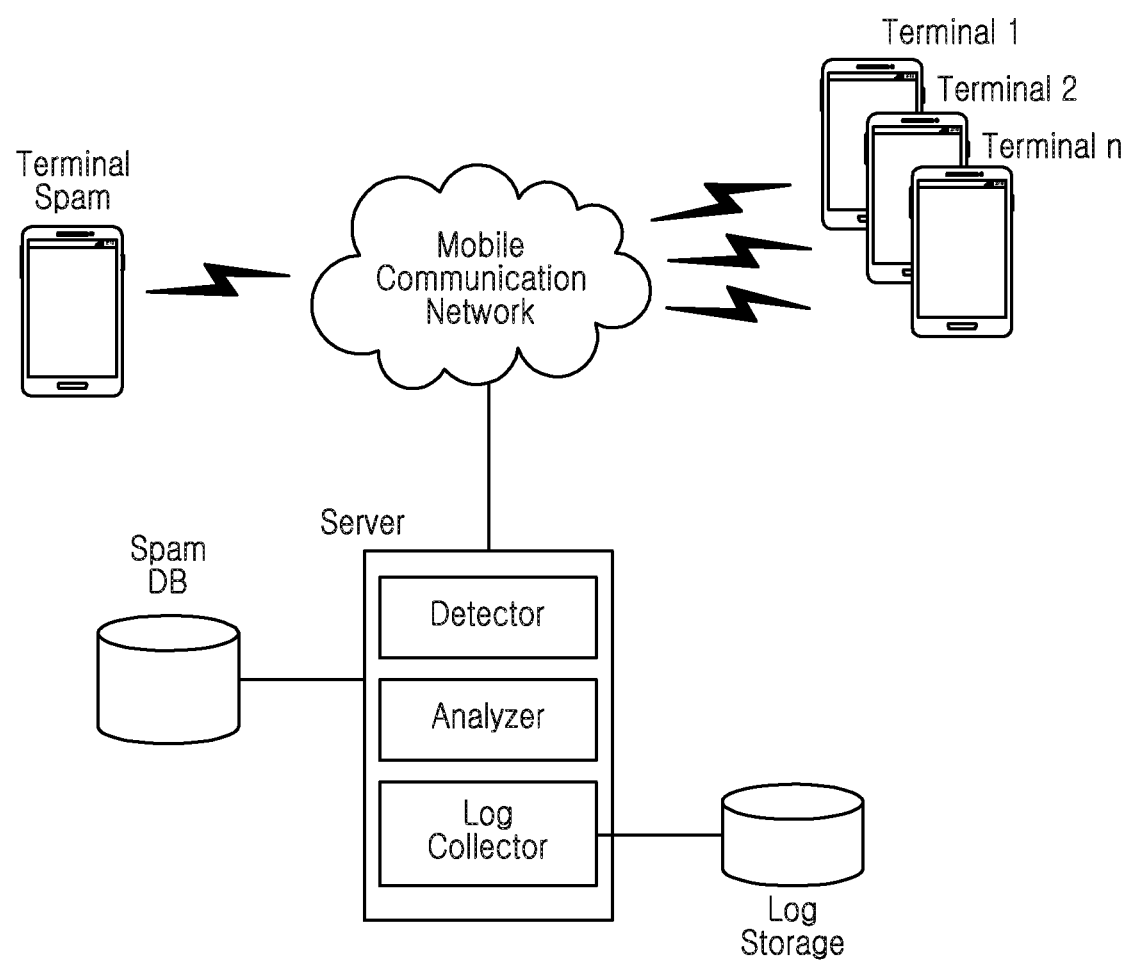
FIG. 12 is a diagram illustrating communication between an electronic device and a server according to an embodiment of the present disclosure.
Figure 13:
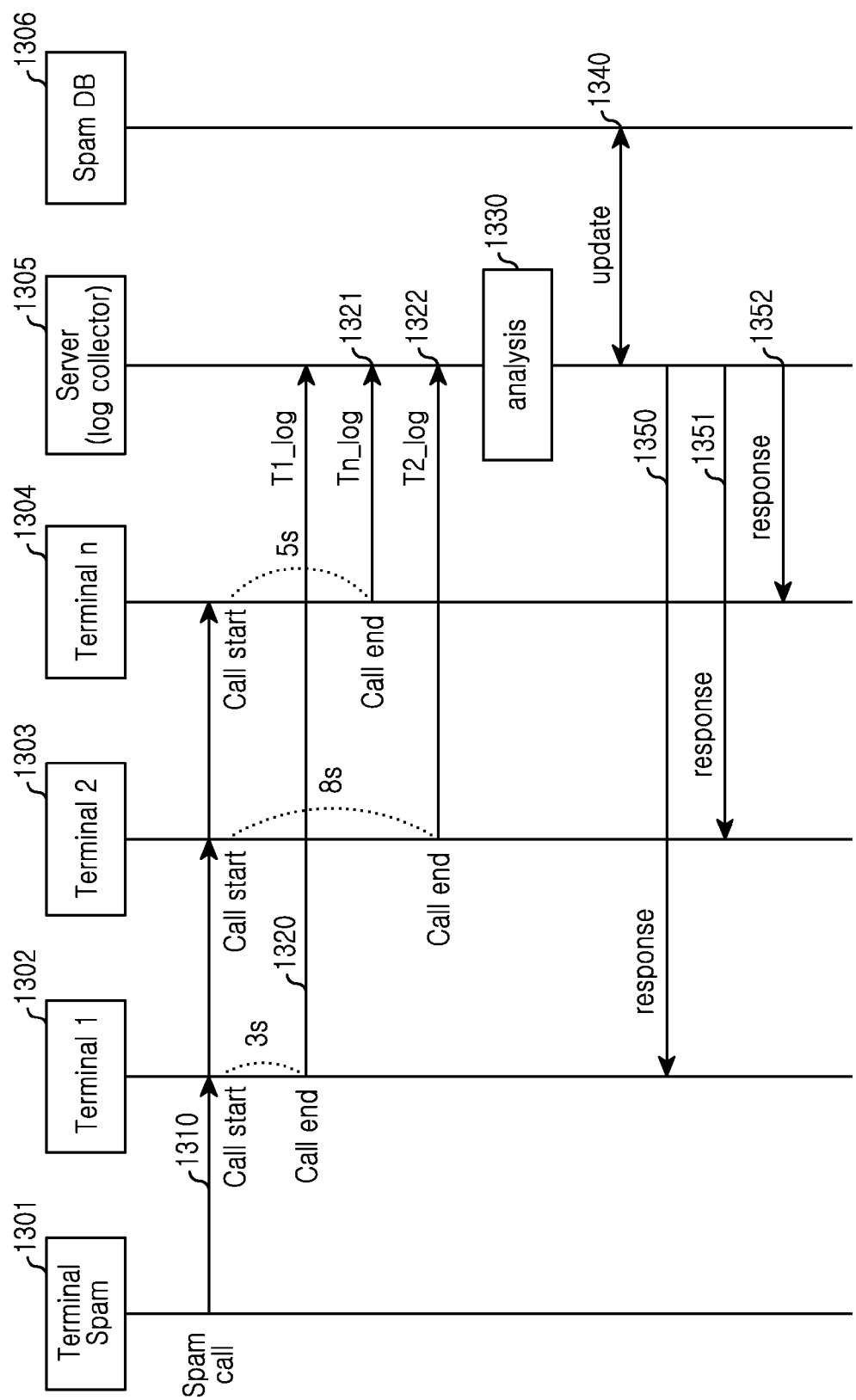
FIG. 13 is a diagram illustrating a process of communicating between an electronic device and a server according to an embodiment of the present disclosure.

FIG. 12 is a diagram illustrating communication between an electronic device and a server according to an embodiment of the present disclosure. FIG. 13 is a diagram illustrating a process of communicating between an electronic device and a server according to an embodiment of the present disclosure. For example, the electronic device, such as a smart phone or a tablet PC may be referred to as a terminal in a mobile communication network.

Referring to FIG. 12, a spam call or a spam message indiscriminately sent by a spam terminal Terminal Spam may be received by a plurality of terminals Terminal 1 to Terminal n through a mobile communication network. For example, when a phone call is answered and then terminated according to a user's selection, the processor 210 of the first terminal transmits log data, such as, a call time and a sender phone number to a server through the mobile communication network.

The log data is transmitted when the call time is equal to or shorter than a preset reference call time. The reference call time may be preset to an experimental time (e.g., 10 seconds) taken for users to terminate a call after the users answer the call because the users do not know that the call is spam. Referring to FIG. 12, the server may be implemented with one integrated server including a detector for performing a spam detection function, an analyzer for analyzing spam information, and a collector for collecting log data. Alternatively, the server may be implemented with a plurality of servers.

The server may manage a variety of spam information that is a large amount of big data which changes at short periods by using a spam database. The server may manage a log storage for collecting the log data in a separated from the spam database or in an integrated manner with the spam database.

After storing the log data received from the first terminal in the log storage, the server analyzes the log data and updates the spam information of the spam database in real time. For example, the server collects and analyzes a large amount of log data T1_log to Tn_log transmitted by the plurality of terminals 1 to n and, when an average call time associated with a specific sender phone number is equal to or shorter than the preset reference time, determines that the sender phone number is a spam phone number.

The server performs an update operation of additionally storing the sender phone number determined as the spam phone number in the spam database in real time. Furthermore, the server generates a response message including the updated spam phone number and transmits the response message to the plurality of terminals Terminal 1 to Terminal n. For example, the first terminal acquires a sender phone number owned by a sender which the user has talked with on the phone for a while because of not knowing that the sender phone number is a spam phone number, through the response message and stores the sender phone number in the spam phone number list.

Referring to FIG. 13, at operation 1310, a spam terminal 1301 may send a spam call to a terminal 1 1302, a terminal 2 1303, and a terminal n 1304.

At operations 1320, 1321, and 1322, the terminal 1 1302, the terminal 2 1303, and the terminal n 1304 may respectively terminate the call (e.g., the spam call) with the spam terminal 1301. In response to each of the terminal 1 1302, terminal 2 1303, terminal n 1304 respectively answering the call from the spam terminal 1 1301, a phone call and then terminating according to a user's selection, the terminal 1 1302, terminal 2 1303, terminal n 1304 respectively transmit transmits log data, such as, a call time and a sender phone number to a server 1305 through the mobile communication network.

At operation 1330, the server 1305 analyzes the log data respectively received at operations 1320, 1321, 1322.

At operation 1340, the server 1305 updates the spam information of the spam database 1306 in real time. For example, the server 1305 may transmit an update of the spam information to the spam database 1306. For example, the server 1305 performs an update operation of additionally storing the sender phone number determined as the spam phone number in the spam database 1306 in real time At operations 1350, 1351, and 1352, the server 1305 transmits a response respectively to terminal 1 1302, terminal 2 1303, and terminal n 1304. For example, the server 1305 generates a response message including the updated spam phone number and transmits the response message.

Figure 14:
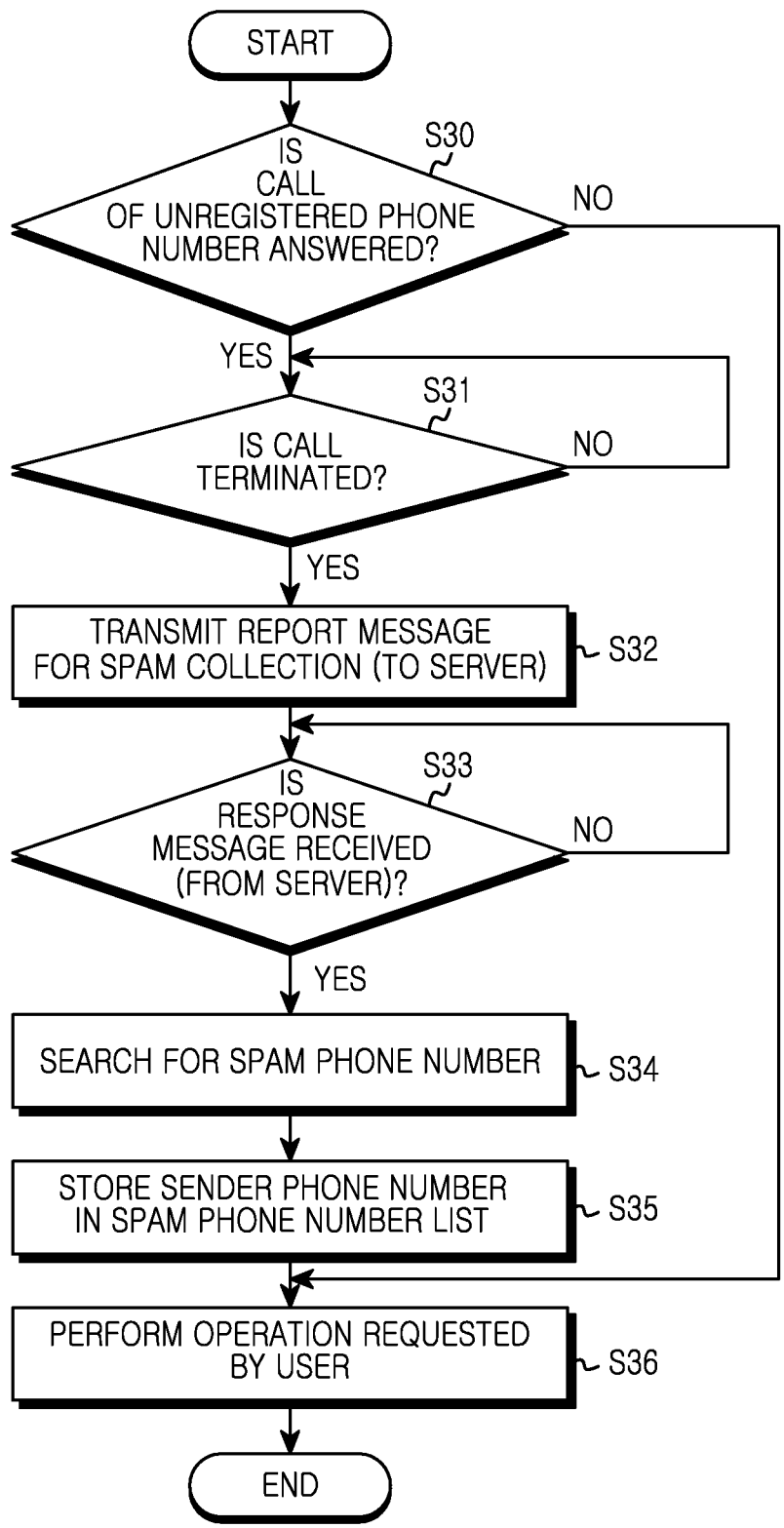
FIG. 14 is a diagram illustrating an operation flow of a method for filtering spam in an electronic device according to an embodiment of the present disclosure.

FIG. 14 is a diagram illustrating an operational flow of a method for filtering out spam in an electronic device according to an embodiment of the present disclosure, and FIG. 15 is a diagram illustrating a configuration of a report message according to an embodiment of the present disclosure.

At operation S30, the processor 210 of the first terminal determines whether a call of an unregistered phone number is answered. For example, the processor 210 of the first terminal determines whether an incoming call is from an unregistered phone number. For example, at operation S30, in a case according to which a user talks with a sender, the processor 210 of the first terminal determines whether the phone number with which the user is talking is not registered in a phone number list in operation S30.

If the processor 210 of the first terminal determines that the call of the unregistered phone number is not answered at operation S30, the processor 210 of the first terminal proceeds to operation S36 at which the processor 210 of the first terminal performs an operation requested by a user (e.g., through user input).

In contrast, if the processor 210 of the first terminal determines that the call of the unregistered phone number is answered at operation S30, then the processor 210 of the first terminal may proceed to operation S31 at which the processor 210 of the first terminal determines whether the call is terminated.

If the processor 210 of the first terminal determines that the call is not terminated at operation S31, then the processor 210 of the first terminal may continue to poll for an indication that the call is terminated.

In contrast, if the processor 210 of the first terminal determines that the call is terminated at operation S31, then the processor 210 of the first terminal may proceed to operation S32 at which the processor 210 of the first terminal may transmit a report message (e.g., to a server) for spam collection. For example, in response to the call being terminated at operation S31, the processor 210 of the first terminal described with reference to FIG. 12 generates a report message and transmits the report message to the server described with reference to FIG. 12 so as for the server to collect spam information at operation S32.

For example, the report message may include a sender phone number phoneNumber and log data, such as a call time CallTime, as illustrated in FIG. 15. The report message may be called another name. When the call time is equal to or shorter than a preset reference call time (e.g., 10 seconds), the report message may be transmitted to the server. The reference call time may be preset to an experimental time (e.g., 10 seconds) taken for users to terminate a call after the users answer the call because the users do not know that the call is spam.

Therefore, the server may efficiently collect many report messages transmitted from a plurality of terminals through a mobile communication network and statistically determine spam phone numbers by analyzing the report messages. Thereafter, the server may update a variety of spam information stored in the spam database in real time. The server generates a response message including the determined spam phone number and transmits the response message to the terminal that has transmitted the report message.

At operation S33, the processor 210 of the first terminal determines whether a response message is received from the server.

If the processor 210 of the first terminal determines that a response message is not received from the server at operation S33, then the processor 210 of the first terminal may continue to poll for an indication that a response message is received from the server.

In contrast, if the processor 210 of the first terminal determines that a response message is received from the server at operation S33, then the processor 210 of the first terminal may proceed to operation S34 at which the processor 210 at the first terminal may search for a spam phone number. In response to the response message transmitted by the server being received at operation S33, the processor 210 of the first terminal searches for the spam phone number included in the response message at operation S34. At operation S35, the processor 210 of the first terminal stores the spam phone number in the spam phone number list. Thereafter, at operation S36, the processor 210 of the first terminal performs an operation requested by the user. Therefore, the processor of the first terminal may efficiently determine whether a received call or message is spam by referring the spam phone number list.

Figure 16:
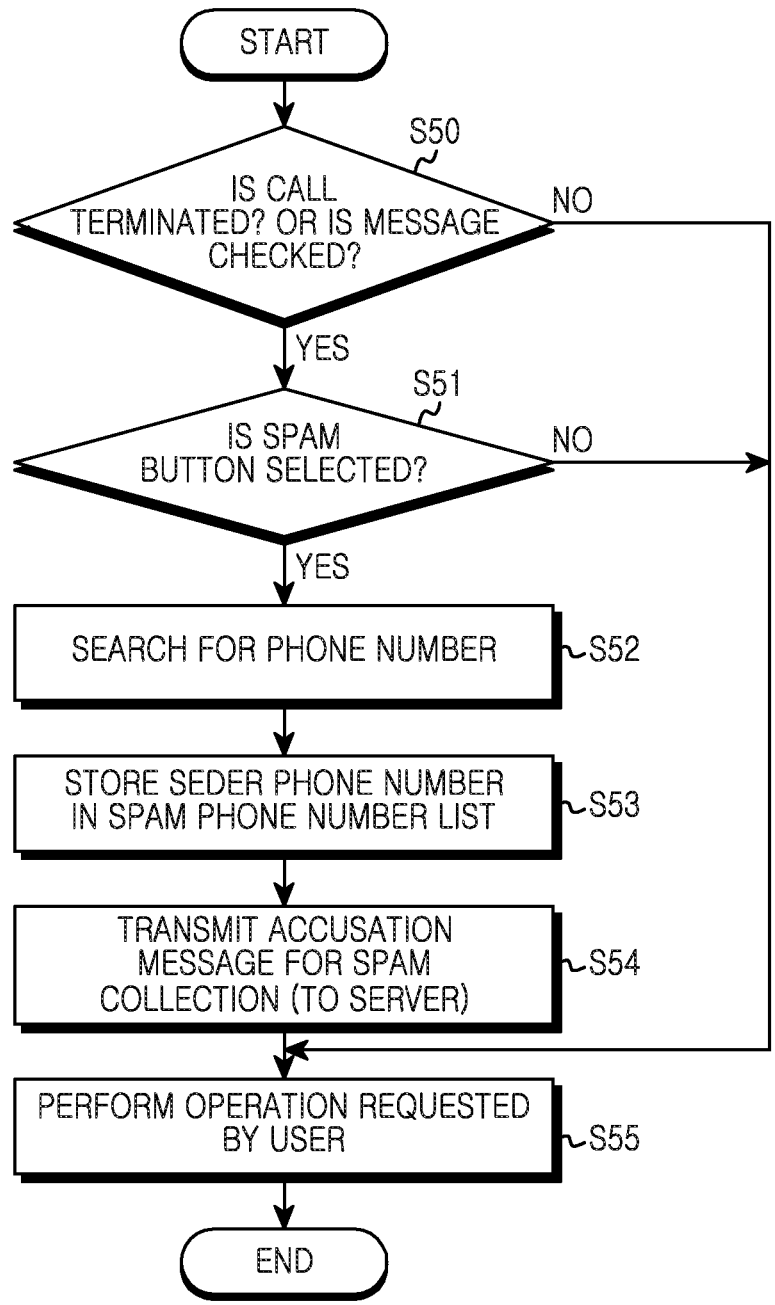
FIG. 16 is a diagram illustrating an operation flow of a method for filtering spam in an electronic device according to an embodiment of the present disclosure.
Figure 17:
FIG. 17 is a diagram illustrating a spam accusation button displayed on an electronic device according to an embodiment of the present disclosure.

FIG. 16 is a diagram illustrating an operational flow of a method for filtering out spam in an electronic device according to an embodiment of the present disclosure, and FIG. 17 is a diagram illustrating display a spam accusation button in an electronic device according to an embodiment of the present disclosure. FIG. 18 is a diagram illustrating a configuration of an accusation message according to an embodiment of the present disclosure.

At operation S50, the processor 210 of the first terminal may determine whether a call is terminated or whether is a message checked.

If the processor 210 of the first terminal determines that the call is not terminated or if the message is not checked at operation S50, then the processor 210 of the first terminal may proceed to operation S55 at which the processor 210 of the first terminal may perform operation requested by the user.

If the processor 210 of the first terminal determines that the call is terminated or if the message is checked at operation S50, then the processor 210 of the first terminal may proceed to operation S51 at which the processor 210 of the first terminal may determine whether a spam button is selected. For example, in response to a phone call being terminated or a message being checked, which is received from a phone number unregistered in the phone number list, the processor 210 of the first terminal described with reference to FIG. 12 may display a spam button for accusing of a spam call or a spam message.

The spam button may be displayed according to the user's selection, or may be displayed automatically when the call time is equal to or shorter than the preset reference time (e.g., 10 seconds). For example, the spam button may be displayed along with a guide message for inquiring whether to accuse of spam as illustrated in FIG. 17.

If the processor 210 of the first terminal determine that the spam button is not selected at operation S51, the processor 210 of the first terminal may proceed to operation S55 at which the processor 210 of the first terminal may perform an operation requested by a user.

In contrast, if the processor 210 of the first terminal determines that the spam button is selected at operation S51, then the processor 210 of the first terminal may proceed to operation S52 at which the processor 210 of the first terminal may search for the phone number. For example, in response to the user selecting the spam button at operation S51, the processor 210 of the first terminal searches for a sender phone number of the call or the message at operation S52. Thereafter, at operation S53, the processor 210 of the first terminal stores the sender phone number in the spam phone number list. At operation S44, the processor 210 of the first terminal generates an accusation message and transmits the accusation message to the server so as for the server described with reference to FIG. 12 to collect spam information. At operation S55, the processor 210 of the first terminal performs an operation requested by the user.

The accusation message may include, for example, a sender phone number SendNumber, a recipient phone number RecNumber, a call time CallTime, a spam message, and the like, as illustrated in FIG. 18. The sender phone number is a sender phone number of a spam call or a spam message. The recipient phone number is a phone number of an accuser of spam, and may be excluded for privacy. When the accusation message is a message for accusing of a spam call, the accusation message may include call time information measured in units of seconds and may do not include message content. When the accusation message is a message for accusing of a spam message, the accusation message may include call time information with a zero value and the whole or a part of message content.

According to various embodiments of the present disclosure, the electronic device, such as a smart phone or a tablet PC, efficiently filters a spam call or a spam message received through a mobile communication network, thereby previously preventing a user to unnecessarily answer the spam call or to unnecessarily check the spam message. In addition, the electronic device transmits the report message including call time information or the like to the serve, or transmits the accusation message including information about a spam call or message to the server according to spam accusation by the user. Therefore, the server may efficiently collect, analyze and update a variety of spam information that is big data in real time.

The methods according to the various embodiments described in the claims and/or specification of the present disclosure may be implemented by hardware, software, or a combination thereof. When the methods are implemented by software, a non-transitory computer-readable storage medium may be provided to store one or more programs (software modules). The one or more programs stored in the non-transitory computer-readable storage medium may be configured for execution by one or more processors in an electronic device. The one or more programs may include instructions for causing the electronic device to execute the methods according to the various embodiments described in the claims and/or specification of the present disclosure.

These programs (software modules or software) may be stored in a random access memory (RAM), a nonvolatile memory including a flash memory, a read only memory (ROM), an EEPROM, a magnetic disc storage device, a compact disk-ROM (CD-ROM), a DVD, another type of optical storage device, or a magnetic cassette.

In addition, the programs may be stored in a memory configured by a combination of some or all of such storage devices. In addition, each of the memories may be provided in plural. In addition, the programs may be stored in an attachable storage device that can be accessed by the electronic device through a communication network such as Internet, Intranet, LAN, wireless LAN (WLAN), or storage area network (SAN), or through a communication network configured by a combination thereof. This storage device may be connected through an external port to the electronic device performing the various embodiments of the present disclosure. In addition, a separate storage device on a communication network may be connected to the electronic device performing the various embodiments of the present disclosure.

In the various embodiments of the present disclosure, the components included therein are expressed in a singular form or a plural form depending on the various embodiments. The expressions of the singular form or the plural form have been properly selected depending on a situation for convenience of description. The various embodiments of the present disclosure are not limited to a singular component or plural components. Any elements expressed in the singular form herein are meant to also include the plural form and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
    transmitting, to a server, a first message for requesting first information related to whether a received call from a first electronic device is spam;
    receiving, from the server, a second message comprising the first information for indicating that the received call is spam, wherein the first information is determined, by the server, based on determining whether an average call duration associated with the first electronic device is equal to or shorter than a first reference time; and
    displaying second information for indicating that the received call is spam according to the first information,
    wherein the average call duration is determined, by the server, based on a plurality of call durations associated with the first electronic device, and
    wherein the plurality of call durations are received from a plurality of other electronic devices.

2. The method of claim 1, further comprising:
    in response to determining that a call duration associated with a second electronic device is equal to or shorter than a second reference time, transmitting a third message to the server,
    wherein the third message comprises information regarding at least one of a phone number of the second electronic device and the call duration associated with the second electronic device.

3. The method of claim 2, wherein the third message is collected by the server such that the server is configured to determine whether the phone number of the second electronic device is spam based on the third message.

4. The method of claim 1, wherein the second message comprises one or more of a result code and a result message, which indicate whether a phone number of the first electronic device is a spam phone number.

5. The method of claim 1, wherein the server is configured to compare a phone number of the first electronic device comprised in the first message with a spam database and transmit the second message indicating whether the phone number is a spam phone number.

6. The method of claim 1, further comprising:
    when a phone number of the received call is not registered in a phone number list stored in the electronic device, transmitting the first message to the server.

7. The method of claim 1, further comprising:
    after the call is terminated, transmitting an accusation message for accusing of spam to the server according to a user's selection of a spam button.

8. The method of claim 7, wherein the accusation message comprises one or more of a sender phone number of the terminated call and the call duration of the terminated call.

9. The method of claim 7, wherein the server is configured to update a spam database to store information based on the accusation message.

10. An electronic device comprising:
a display;
a communication module;
at least one memory storing instructions; and
at least one processor configured to execute the stored instructions to:
transmit, to a server, a first message for requesting first information related to whether a received call from a first electronic device is spam,
receive, from the server, a second message comprising the first information for indicating that the received call is spam in response to the first message, wherein the first information is determined, by the server, based on determining whether an average call duration with the first electronic device is equal to or shorter than a first reference time, and
display, on the display, second information for indicating that the received call is spam according to the first information,
wherein the average call duration is determined, by the server, based on a plurality of call durations associated with the first electronic device, and
wherein the plurality of call durations are received from a plurality of other electronic devices.

11. The electronic device of claim 10, wherein the at least one processor is further configured to execute the stored instructions to, in response to determining that a call duration associated with a second electronic device is equal to or shorter than a second reference time, transmit a third message to the server,
wherein the third message comprises information regarding at least one of a phone number of the second electronic device and the call duration associated with the second electronic device.

12. The electronic device of claim 10,
wherein the third message is collected by the server such that the server is configured to determine whether the phone number of the second electronic device is spam based on the collected the third message, and
wherein the response message comprises one or more of a result code and a result message which indicate whether the phone number of the second electronic device is a spam phone number.

13. The electronic device of claim 10, wherein the server is configured to compare a phone number of the first electronic device comprised in the first message with a spam database and transmit the second message indicating whether the phone number is a spam phone number.

14. The electronic device of claim 10, wherein, the at least one processor is further configured to execute the stored instructions to, when a phone number of the received call is not registered in a phone number list stored in the electronic device, transmit the first message to the server.

15. The electronic device of claim 14, wherein the at least one processor is further configured to execute the stored instructions to:
search for a spam phone number from a spam phone number list updated by the server.

16. The electronic device of claim 10,
wherein, the at least one processor is further configured to execute the stored instructions to, after the call is terminated, transmit an accusation message for accusing of spam to the server according to a user's selection of a spam button, and
wherein the server is configured to update a spam database based on the accusation message.

* * * * *